(12) United States Patent
Schmitt et al.

(10) Patent No.: US 6,715,823 B2
(45) Date of Patent: Apr. 6, 2004

(54) CONVERTIBLE TOP

(75) Inventors: Andreas Schmitt, Eching (DE);
Harald Siring, Munich (DE); Manfred Kasparak, Neureichenau (DE)

(73) Assignee: Parat Automotive Schonenbach GmbH + Co. KG, Remscheid (DE)

( * ) Notice: Subject to any disclaimer, the term of this patent is extended or adjusted under 35 U.S.C. 154(b) by 0 days.

(21) Appl. No.: 10/228,175

(22) Filed: Aug. 26, 2002

(65) Prior Publication Data

US 2003/0057740 A1 Mar. 27, 2003

(30) Foreign Application Priority Data

Aug. 24, 2001 (DE) .......................... 101 41 550

(51) Int. Cl.$^7$ .............................. B60R 27/00
(52) U.S. Cl. ............ 296/225; 296/107.01; 296/107.09
(58) Field of Search .................... 296/225, 107.01, 296/107.09, 108, 145

(56) References Cited

U.S. PATENT DOCUMENTS

| | | | | |
|---|---|---|---|---|
| 1,709,367 A | * | 4/1929 | Olguin | |
| 3,252,731 A | * | 5/1966 | Brynn et al. | ................. 296/145 |
| 3,256,034 A | * | 6/1966 | Condray | |
| 3,976,324 A | | 8/1976 | Lehmann | |
| 4,323,276 A | * | 4/1982 | Hira et al. | ................... 296/214 |
| D273,668 S | * | 5/1984 | Di Geronimo, III | ......... D12/92 |
| 4,819,983 A | * | 4/1989 | Alexander et al. | ............ 296/76 |
| 5,429,409 A | | 7/1995 | Corder | |
| D469,734 S | * | 2/2003 | Tyrer | ......................... D12/401 |

FOREIGN PATENT DOCUMENTS

| | | |
|---|---|---|
| DE | 2 337 485 | 9/1974 |
| DE | 82 05 999 | 7/1982 |
| DE | 3416285 | 4/1984 |
| DE | 41 28 115 | 11/1992 |
| DE | 44 41 266 | 11/1995 |
| DE | 197 31 330 | 2/1999 |
| DE | 198 05 657 | 8/1999 |
| DE | 199 00 909 | 7/2000 |

* cited by examiner

*Primary Examiner*—Dennis H. Pedder
*Assistant Examiner*—Lori L Coletta
(74) *Attorney, Agent, or Firm*—Herbert Dubno; Andrew Wilford

(57) ABSTRACT

A convertible top has according to the invention a flexible textile cover formed of a generally horizontal top panel extending generally rearward from a front edge, a rear panel extending downward from and joined at a rear seam to the front panel, and a pair of generally vertical side panels unitarily formed with the rear panel, extending forward therefrom, and joined at respective side seams to the top panel. The side seams are generally horizontal. In addition the rear seam is generally horizontal and the side seams form end continuations of the rear seam.

2 Claims, 3 Drawing Sheets

CONVERTIBLE TOP

FIELD OF THE INVENTION

The present invention relates to convertible top.

BACKGROUND OF THE INVENTION

Figure 2:
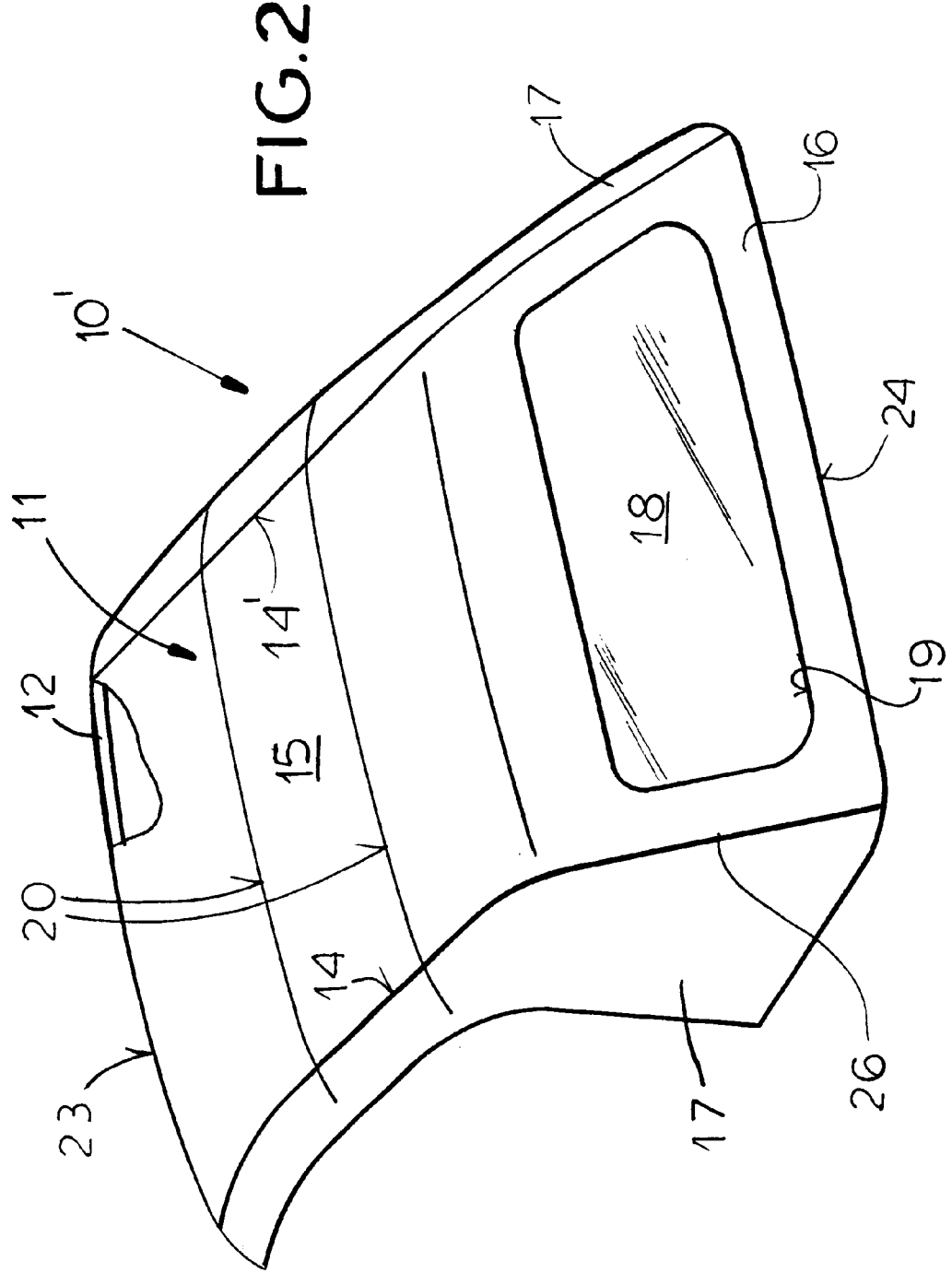
FIGS. 2 and 3 are views like FIG. 1 of prior-art convertible tops.
Figure 3:
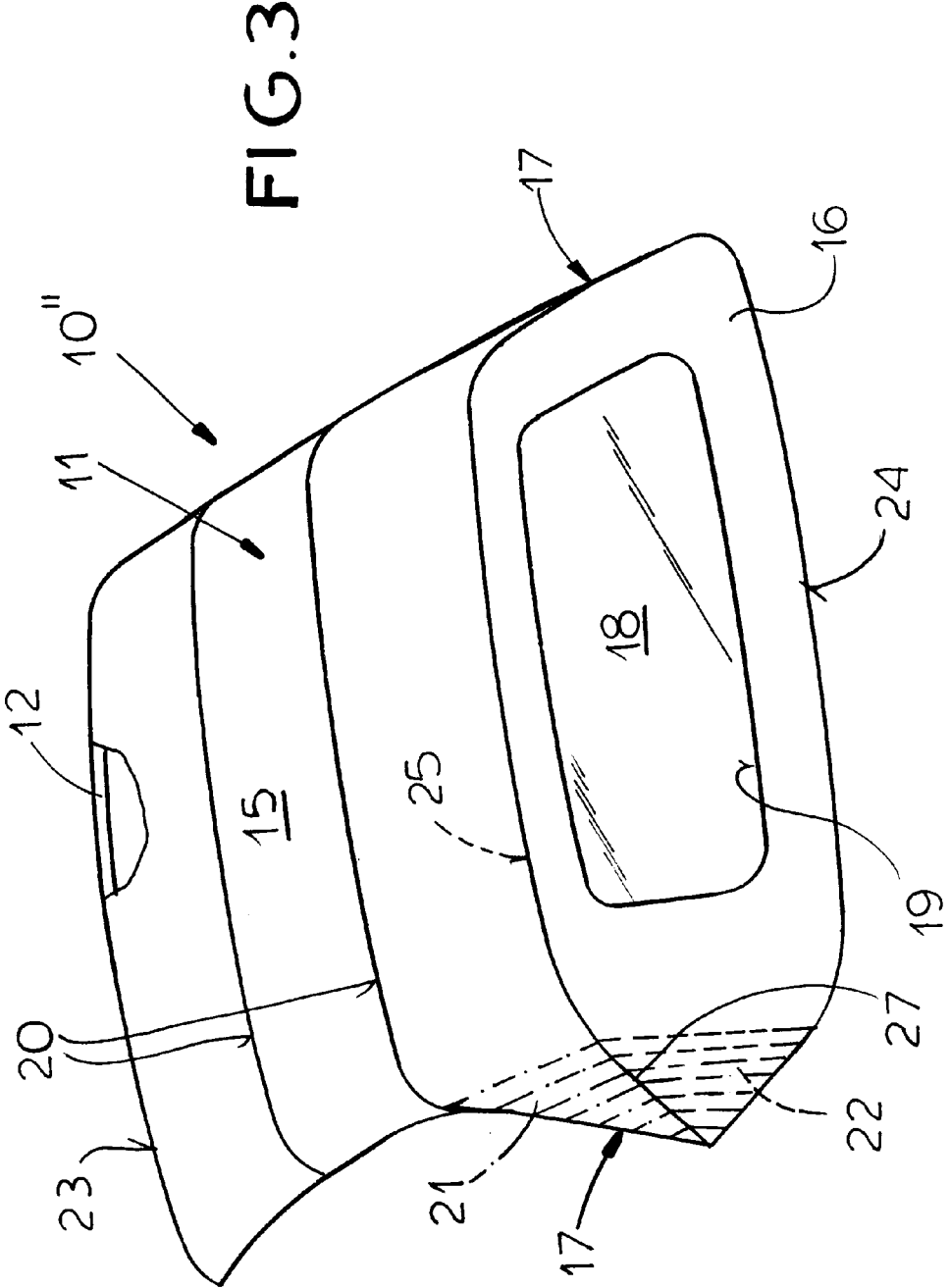

As shown in FIGS. 2 and 3, standard convertible tops 10' and 10" each comprise a flexible and waterproof textile cover 11 having a front end 23 and a rear end 24 and stretched over a frame partly shown at 12. The cover 11 comprises a mainly horizontal roof panel 15 that extends back from the front end 23 and that is creased at 20 where it is stretched over ribs of the frame 12, side panels 17 that are mainly vertical, and a rear panel 16 that is normally formed with a hole 19 accommodating a rear window 18 and that extends to the rear end 24.

In FIG. 2 the top panel 15 and the rear panel 16 are formed of a single piece and the side panels 17 are separate pieces joined to side edges of the top panel 15 at a horizontal seam 14 and to side edges of the rear panels at angled rear seams 26. Thus this system is made of three separate pieces that must be stitched together. In addition the seams 14 are folded at several locations, so that with time they will loosen and leak.

In FIG. 3 the top panel 15 is separate from the rear panel 16 and has a rear edge joined to it at a rear seam 25. The top panel 15 is formed with a pair of front gores 21 and the rear panel with a pair of rear gores 22 joined together at generally vertical seams 27 forming continuations of the seam 25. The two gores 21 and 22 on each side form the respective side panel 17. While this top 10" is only made of two pieces, they are shaped such that there is considerable waste when they are cut out. The vertical seams 27 forming extensions of the rear seam 14 are potential leak zones.

Such tops 10' and 10" and the systems for seaming them together are described in U.S. Pat. No. 5,429,409 as well as in German patent documents 2,327,485 of Lehmann, 4,128, 115 of Claar, 4,441,266 of Meister, 197 31 330 of Leutz, 198 05 657 of Bauer, 199 00 909 of Dangle, and 82 05 999.

OBJECTS OF THE INVENTION

It is therefore an object of the present invention to provide an improved convertible top.

Another object is the provision of such an improved convertible top which is easy and efficient to manufacture, attractive.

A further object is to provide a convertible top particularly resistant to leaking, especially at the seams joining the panels forming the flexible cover.

SUMMARY OF THE INVENTION

A convertible top has according to the invention a flexible textile cover formed of a generally horizontal top panel extending generally rearward from a front edge, a rear panel extending downward from and joined at a rear seam to the front panel, and a pair of generally vertical side panels unitarily formed with the rear panel, extending forward therefrom, and joined at respective side seams to the top panel.

In accordance with the invention the side seams are generally horizontal. In addition the rear seam is generally horizontal and the side seams form end continuations of the rear seam.

Such a convertible top is extremely attractive, having simple and very clean lines. Furthermore since it is comprised of two large basically rectangular pieces it can be made with relatively little waste, as for instance the material loss to form gores making up side panels is completely avoided.

SPECIFIC DESCRIPTION

Figure 1:
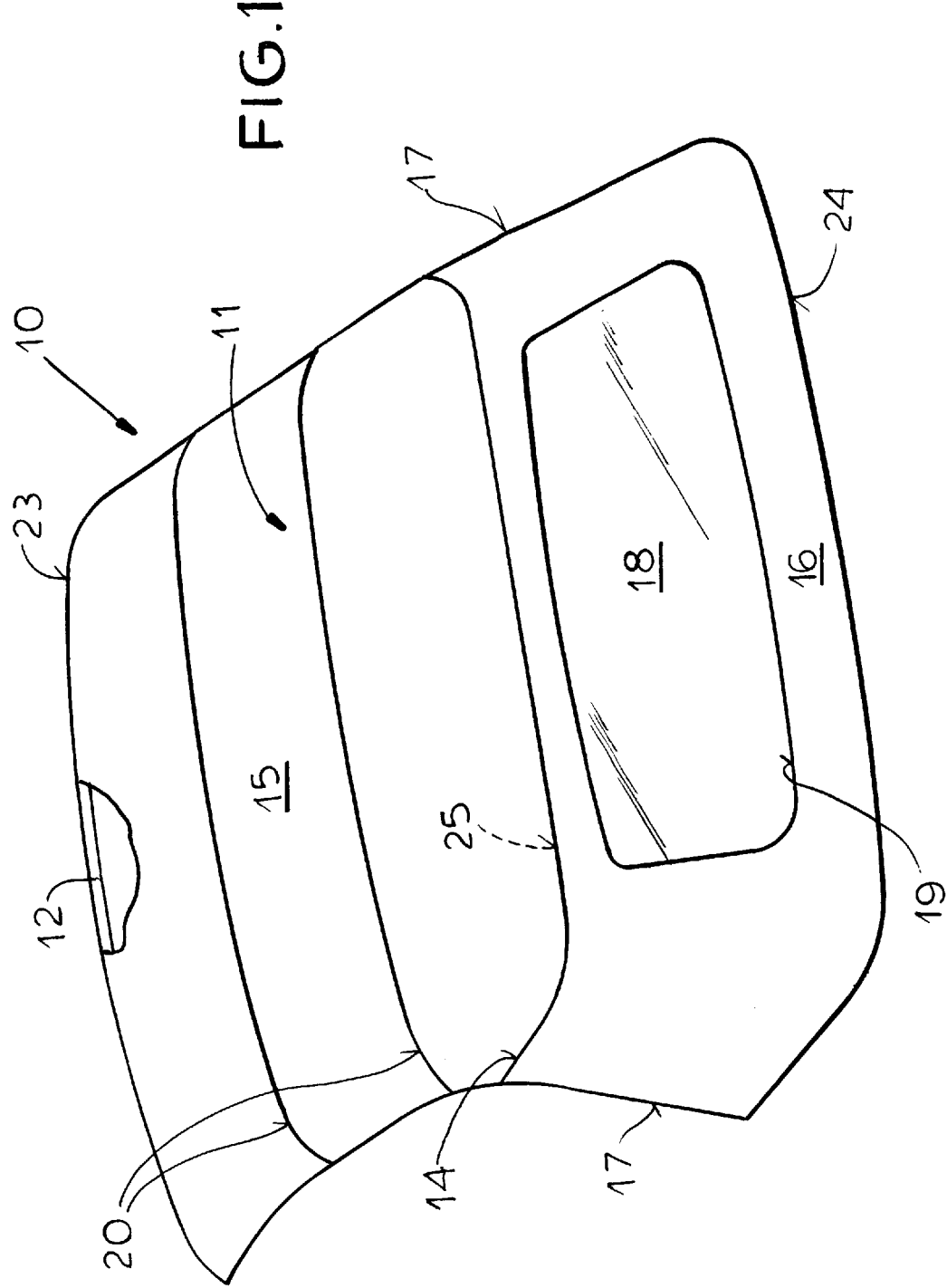
FIG. 1 is a partly broken away perspective view of a convertible top according to the invention.

As seen in FIG. 1, where reference numerals used in FIGS. 2 and 3 relate to functionally identical structure, the rear panel 16 is separate from the top panel 15 and is joined to it at the horizontal rear seam 25. In addition the rear panel 16 is unitarily formed with the side panels 17 that are joined to the top panel 15 at the horizontal side seams 14 forming continuations of the rear seam 25. Thus the only seam between the two parts of the flexible cover 11 lies in a horizontal plane so that the cover 11 can be manufactured with ease and the seam 14, 25 is unlikely to leak. In addition the one-piece constructions of the side and rear panels 16 and 17 is quite attractive and durable.

We claim:

1. A convertible top comprising:
   a flexible textile cover formed of
      a generally horizontal top panel extending generally rearward from a front edge,
      a rear panel extending downward from and joined at a generally horizontal rear seam to the front panel, and
      a pair of generally vertical side panels unitarily formed as a single piece with the rear panel, extending forward therefrom, and joined at respective generally horizontal side seams to the top panel.

2. The convertible top defined in claim 1 wherein the side seams form end continuations of the rear seam.

* * * * *